United States Patent
Servida

(10) Patent No.: US 9,487,417 B2
(45) Date of Patent: Nov. 8, 2016

(54) OPERATING METHOD OF AN APPARATUS FOR PURIFYING A FLUID AND APPARATUS FOR PURIFYING FLUID

(75) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 301 days.

(21) Appl. No.: 13/696,179

(22) PCT Filed: May 5, 2011

(86) PCT No.: PCT/IB2011/000957
§ 371 (c)(1),
(2), (4) Date: Jan. 29, 2013

(87) PCT Pub. No.: WO2011/138663
PCT Pub. Date: Nov. 10, 2011

(65) Prior Publication Data
US 2013/0118918 A1    May 16, 2013

(30) Foreign Application Priority Data
May 5, 2010 (IT) .............................. PD2010A0144

(51) Int. Cl.
*C02F 1/469* (2006.01)

(52) U.S. Cl.
CPC ..... *C02F 1/4691* (2013.01); *C02F 2201/4617* (2013.01); *C02F 2201/46125* (2013.01); *C02F 2209/05* (2013.01); *C02F 2209/40* (2013.01)

(58) Field of Classification Search
CPC .................................................. C02F 1/4691
See application file for complete search history.

(56) References Cited

U.S. PATENT DOCUMENTS 5,360,540 A    11/1994   Andelman
6,325,907 B1   12/2001   Andelman (Continued)

FOREIGN PATENT DOCUMENTS

JP      2001058183 A  *  3/2001  ............... C02F 1/46
WO   2005/015584 A2      2/2005

OTHER PUBLICATIONS

Alkuran, M. et al., "Utilization of a Buck Boost Converter and the Method of Segmented Capacitors in a CDI Water Purification System", Power System Conference, 12th International Middle East, pp. 470-474, 2008.

*Primary Examiner* — Keith Hendricks
*Assistant Examiner* — Salil Jain
(74) *Attorney, Agent, or Firm* — Browdy and Neimark, PLLC

(57) ABSTRACT

Operating method of an apparatus for purifying a fluid by means of an apparatus provided with an even number of cells, each of which comprises at least one lead through condenser and is electrically connected to a direct current power supply. The method foresees cyclically repeating, for each cell, a charging step, in which the power supply charges the electrodes of the cell at different polarity; a service step, in which a flow of fluid to be treated is forced to pass through the electrodes of the lead through condenser of the cell with progressive build-up of the ionized particles of the fluid on the electrodes; and a regeneration step, in which the electrodes are discharged and a flow of washing fluid is forced to pass in the condenser of the cell with consequent removal of the ionized particles built up on the electrodes. Starting from the charging step of at least one first cell of the two cells, the second cell, once its service step is complete and at the start of its regeneration step, is connected in series with reverse polarity to the first cell to at least partially discharge its electrodes on the first cell in an energy recovery step. During the energy recovery step the first cell is also jointly powered by the power supply, which detects the voltage on the first cell and by means of a control card controls the supply voltage to make a preset operating voltage across the first cell.

5 Claims, 16 Drawing Sheets

(56) References Cited

U.S. PATENT DOCUMENTS

| | | |
|---|---|---|
| 6,413,409 B1 | 7/2002 | Otowa |
| 6,709,560 B2 | 3/2004 | Andelman et al. |
| 7,175,783 B2 | 2/2007 | Curran |
| 2004/0121204 A1* | 6/2004 | Adelman et al. ............... 429/22 |
| 2005/0015584 A1 | 1/2005 | Takechi et al. |
| 2009/0045048 A1* | 2/2009 | Bourcier et al. ........... 204/228.1 |
| 2010/0044244 A1* | 2/2010 | Lee ....................... C02F 1/4691 205/687 |

* cited by examiner

OPERATING METHOD OF AN APPARATUS FOR PURIFYING A FLUID AND APPARATUS FOR PURIFYING FLUID

FIELD OF APPLICATION

The present invention concerns an operating method of an apparatus for purifying a fluid and an apparatus for purifying a fluid, in particular for carrying out the aforementioned method, according to the preamble of the respective independent claims.

In greater detail, the apparatus according to the invention is intended to be advantageously used to remove undesired concentrations of contaminants from fluids, and more specifically usually from liquids, said contaminants for example consisting of salts dissolved inside the fluids, i.e. to concentrate ionized particles inside fluids, particularly from industrial processes, to make it easier to recover or dispose of.

The aforementioned apparatus uses lead through condensers according to manufacturing and operating principles that allows its manufacturing and operating costs to be reduced.

The apparatus in question can be intended for multiple applications both in the industrial and civil field, like thr example seawater desalination, softening of particularly hard water, the removal from water of salts (such as chlorides and sulphates), of nitrates, of nitrites, of ammonia, of heavy metals, of organic substances or of micropollutants in general, or else to deionize fluids for example of industrial processes or for the concentration of polluting substances that are difficult to dispose of or advantageous to recover for reuse.

The present invention therefore generally applies to the industrial field of the production of apparatuses for the purification of fluids.

STATE OF THE ART

Apparatuses for purifying fluids by means of lead through condensers conventionally comprise one or more cells connected in series or in parallel, each provided with one or more lead through condensers each in turn equipped with a plurality of overlapping electrodes, between which a flow of fluid to be purified is made to pass both in order to concentrate a solute with ionized particles, and in order to obtain a solvent purified of such particles (be they ions, or other charged substances according to the specific application).

The electrodes of the lead through condensers are formed with layers of conductive materials facing one another and charged at opposite polarities by a direct current power supply to generate an electrostatic field between the adjacent electrodes, During a foreseen service step, the fluid runs between the electrodes at different polarity and the charged particles present in the fluid, for example ions of dissolved salts, are attracted by the electrodes and held on them by the action of the electric field.

In a regeneration step after the service step, the electric field is remove and the ions, which have built up on the electrodes, are evacuated by using a washing flow.

The alternating layers of electrodes are separated from one another by spacing layers, in which the flow of fluid flows. Such spacing layers are made from a non-conductive and porous material like for example a nylon fabric.

Lead through condensers of the known type indicated above are for example described in U.S. Pat. Nos. 6,113,409 and 5,360,540.

The operation of such condensers foresees the alternation of service steps, in which there is the concentration of the ions present in the fluid at the opposite electrodes, and regeneration steps, in which the ions built up on the electrodes are removed by means of the aforementioned discharge flow.

The ability of the electrodes to capture the ions in solution, and more generally the charged particles, is a characteristic that has a positive impact upon the operation of the condenser. The electrodes in the lead through condensers electrostatically absorb and release the contaminants of ionic charges and actively participate in the process of deiunizing the liquid to be treated. The electrodes are for this purpose formed from porous structures of conductive materials.

For this, for example, there are numerous known materials that can be used to make electrodes like for example spongy active carbon moulded in the form of sheets or fibres as described for example in U.S. Pat. No. 6,413,409 or else sheets of a mixture comprising PTFE as described for example in U.S. Pat. No. 6,413,409

Furthermore, it is known from U.S. Pat. No. 6,709,560 that it is possible to associate the surfaces of the conductive layers of the electrodes with layers of permeable or semi-permeable material, in particular capable of selectively trapping the ions that migrate towards the corresponding electrode under the action of the field. Such layers for example consist of a semi-permeable membrane selectively of the anion exchange or cation exchange type. The ions are thus held or trapped in the layer of such material close to the electrode towards which they migrate, no longer being subjected to the vortex action of the fluid. The use of these materials has allowed the efficiency of through lead through condensers to be improved, allowing a greater amount of ions, and more generally of charged contaminants, to be held and concentrated on the electrodes.

It should be observed that unlike other electro-deionization systems, the method for removing the solutes used in through lead through condensers does not substantially involve redox reactions and the passing of current between the electrodes is mainly due to the release of charge following the contact of the ions with the electrodes under the action of the field.

According to the applications it may be necessary to have purification apparatuses equipped with numerous cells each having one or more through lead through condensers, to treat large volumes of fluid or else to lower the conductivity of a flow of fluid in many successive steps until it is brought to desired values.

Each cell behaves electrically substantially like a condenser of substantial capacity. Therefore, the cell, during the charging and discharging transients of the operating cycle, absorbs or releases high current peaks of the order of a few hundreds of amperes and for example typically of the order of 200 amperes.

For this purpose, the cell is powered by means of big bars of copper able to transfers large flows of current.

The electronics that must manage the polarity reversal of such high peak currents, at the same time having to contain the voltage drops in switching so as to limit consumption, have the drawing of being rather complex and burdensome.

The high current absorption peak is used to charge the condenser of the cell during an initial period of the charging step, of the order of a few seconds. The energy used in this step is not intended to remove charged particles from the fluid, but just to charge the condenser. Differently, when the fluid flows in the cell, the charged particles are held on the electrodes determining a passage of current in the condenser corresponding to the energy consumption to be supplied to treat the fluid.

The use of purification apparatuses with cells electrically connected in parallel involves the simultaneous powering of the same cells with a consequent sum of the current peaks when charging and discharging and thus, coverall, with an increase in the expense for the sizing of the power supply.

In order to limit this drawback it is also known to power a pair of cells of a purification apparatus with lead through condensers by making the two cells work alternately and by controlling their power supply through two H-bridges.

In this case, it is sufficient for the power supply to be sized to power the current peak of just one cell increased by the absorption of service current of the other cell, thus with a substantial saving in sizing the power supply.

It is known from patent US2004/0121204 to use an apparatus for purifying a fluid, of the type with lead through condensers, equipped with a plurality of cells electrically connected preferably in series and preferably hydraulically in parallel. This known apparatus foresees monitoring and controlling the voltage of each individual cell in order to maximise the amount of charge and the voltage on the condensers of the cells, minimising the absorption of the current peaks.

In greater detail, such an apparatus comprises means for reading the voltage on the individual cells, which emit a signal that is compared with a reference signal. If such a signal leaves a predetermined range, suitable control means take care of decreasing the flow of fluid through one or more cells. in other words, the control of the flow is used to adjust the voltage on the individual cells to take the signal to the optimal value. Such a control method can be used by itself or in combination with a method for electronically monitoring and controlling the voltage on the individual cells, or in combination with threshold controls that electrically bypass the condensers that are not operating and that close the flow passage through the relative cells, for example by using valves and control means of the aforementioned valves.

In some cases, a cell can deviate from the optimal voltage levels, but can continue to have some functional utility. In such cases, a variable flow valve can be used to increase or decrease the flow of fluid intended for the cell. By varying the amount of flow of fluid, the voltage of the individual cell can indeed by influenced.

The control system used to control the variable flow valves can be obtained with a conductivity controller, which checks the quality of the water, a flow controller, which checks the fluid flow passage in the cells, or a voltage controller that checks the voltage on the individual cells.

Differently, the voltage on the individual cells can be adjusted automatically through electronic means like for example through field effect transistors (FET), transistors, or zener diodes.

The control systems for apparatuses with lead through condensers described in this patent US2004/0121204 allow the use of the cells to be optimised by electrically and hydraulically connecting them together in order to maximise the voltage on the individual condensers and minimise the absorption of the current peaks.

However, the principles used in such control methods do not allow high energy savings to be achieved. In particular, the cells continue to operate with quite high cyclical consumption that especially in the case of apparatuses intended to filter high flow rates or else intended to cut the conductivity from very high values, like for example to take seawater from the usual 50,000 microsimens to no more than a few hundreds of microsimens, involve very high operating costs due to energy consumption.

From patent WO 2005/015584 a purification apparatus with lead through condensers is also known, which comprises an electrical power source, a plurality of switches connected to the power supply, a container of many capacitive cells, a set of electrodes, a plurality of electrical collectors each connected to said set of electrodes and to a switch through a programmable integrated circuit. The latter controls and actuates the switches in a sequence that is programmed or controlled in feedback by values of conductivity, PH, flow, current, or voltage sent by a corresponding sensor to the integrated circuit. The switches can in turn be integrated circuits that modulate the current sent to the individual collectors. The apparatus powered and controlled in sequence object of patent WO 2005/015584 individually controls the cells of lead through condensers or many groups of cells, in a timed sequence, through individual cells out of phase with each other.

In order to reduce the peak power of the power supply even by 30%-50%, or to level off the charging power or to level off the current of the apparatus, there are charging cycles of the individual cells or of groups of cells, be they in series or in parallel, actuated in sequence, in particular between 1 and 359 degrees out of phase.

Preferably, the apparatus is configured to have one or more treatment steps in succession obtained with cells situated in the same container.

Lead through condensers of the type known up to now do not allow the energy used to saturate the electrodes with the charged particles to be recovered and are limited to optimising the electrical circuits to contain the voltage peaks and the hydraulic circuits for better capturing efficiency of the electrodes, without however having satisfactory energy efficiency. From patent JP2001058183 an apparatus for purifying a fluid is known that is equipped with two lead through condensers able to be connected in parallel to use part of the charge of one of them, which enters in a regeneration step, to partially charge the armatures of the other, which ends its regeneration step.

In particular, whereas a first condenser is active and absorbs ions from the fluid to be treated that passes through it, the second condenser has the armatures in short-circuit and releases the ions previously collected and present on its armatures to a washing fluid that crosses it.

When the first condenser reaches saturation, its electrical power supply interrupted and the switches of the circuit re actuated so as to connect the two condensers in parallel, the first charged to the second substantially discharged.

Thus, part of the charge of the first condenser is transferred to the armatures of the second condensers.

The devices described in this patent thus only allow the energy built up on the charged condenser to be partially recovered and have undesired inactivity times due to the periods of disconnection of the condensers from the generator, for transferring charges connected together in parallel.

Moreover, from American U.S. Pat. No. 6,325,907 there is a known apparatus for purifying a fluid with lead through condensers and an operating method thereof, particularly for obtaining desalination of seawater in an energy-efficient manner.

In order to obtain the purification of the water using little energy, the condensers are charged and discharged, cyclically, in conditions corresponding to a low voltage with respect to their charge curve, and in particular to a voltage not exceeding 1 Volt.

In particular, in such a document the inventor suggests helping the charging of a discharged condenser by connecting it in parallel to a charged condenser.

This apparatus also has substantially the same drawback of the apparatus described earlier, i.e. it only allows at most partial recovery of the energy built up on the charged condenser, also having times of inactivity, corresponding to periods of disconnection of the condensers from the generator, for transferring charges between them when they are connected in parallel.

PRESENTATION OF THE INVENTION

In this situation the problem forming the basis of the present invention is therefore that of eliminating problems of the prior art quoted above, providing an operating method of an apparatus for purifying a fluid, which allows the energy-efficiency to be improved for the same filtering efficiency of charged particles present in the fluid.

Another purpose of the present invention is to provide an apparatus for purifying a fluid that is simple and cost-effective to make and operatively totally reliable.

Another purpose of the present invention is to provide an apparatus for purifying a fluid, which allows the energy consumption to be contained.

BRIEF DESCRIPTION OF THE DRAWINGS

The technical characteristics of the finding, according to the aforementioned purposes, can be clearly seen from the content of the claims given below and the advantages thereof will become clearer in the following detailed description, made with reference to the attached drawings, which represent two embodiments thereof purely as non-limiting examples, in which:

DETAILED DESCRIPTION OF A PREFERRED EXAMPLE EMBODIMENT

Figure 1:
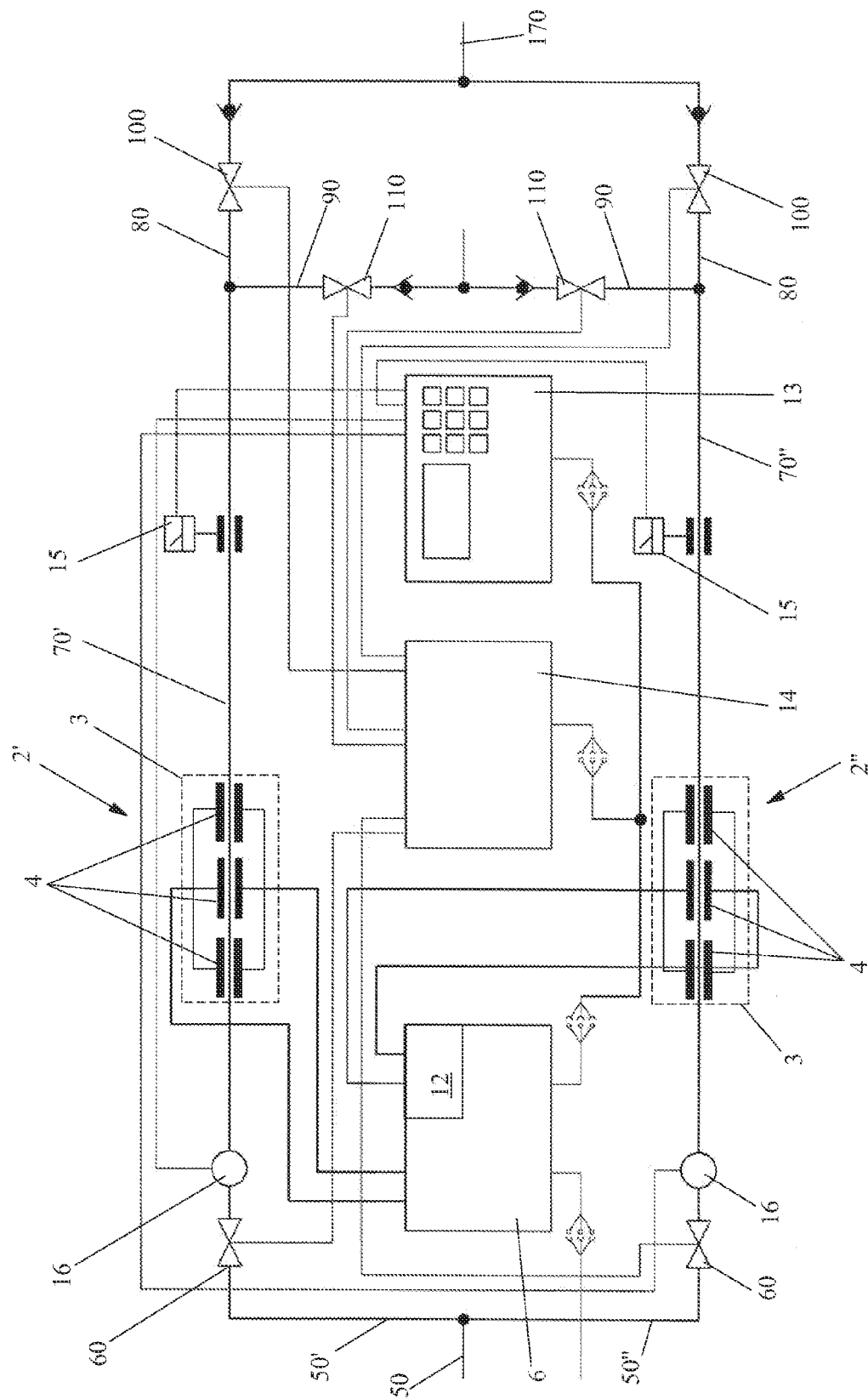
FIG. 1 shows an electrical and hydraulic operating scheme of an apparatus for purifying a fluid, according to the present invention.

With reference to the attached drawings an example of an apparatus for purifying a fluid, object of the present invention, has been wholly indicated with 1.

The apparatus 1, according to the invention, lends itself to being used for the purification of fluids from ionized particles present inside it that are able to be affected by the presence of an electric field, like for example ions in solution.

Hereafter any contaminant dissolved in the fluid to be treated capable of being attracted by an electrostatic field, like in particular the ions dissolved in a fluid, will be generically indicated with the term ionized particles.

The apparatus therefore lends itself to operating to deionise fluids of industrial processes and to deionise water, in particular to soften mains water and to desalinate seawater, in particular being able to remove salts in solution (such as chlorides and sulphates), nitrates, nitrites, ammonia, and other polarized contaminants of organic substances or of micropollutants in general from inside it.

The apparatus also lends itself to concentrating within fluids, particularly of industrial processes, ionized particles to make it easier to recover or dispose of them.

In the example embodiment illustrated in the attached figures the apparatus for purifying a fluid, according to the invention, is provided with an even number of cells 2 (shown in the various figures as 2', 2").

As will be made clearer hereafter, the apparatus 1 according to the invention foresees staggered operation of the two cells 2 or of the two groups of cells 2, in order to be able, in a foreseen energy recovery step of the cycle of the cell, to transfer the charge built up during a service step of a cell (or of a group of cells) onto the other cell (or else onto the other group of cells) which must be charged to in turn begin the service step.

In greater detail, each cell comprises a containment structure 3 with one or more lead through condensers 4 housed inside it, said condensers being electrically connected together in series or in parallel. Each condenser 4 is in turn provided with two or more overlapping electrodes 5 (FIG. 13), facing one another, generally having a shape that is thinned out, flat or wound for example to form a cylinder.

A flow of fluid to be treated containing ionized particles is susceptible to pass between the electrodes 5.

Each cell 2 is electrically connected to a DC power supply 6 suitable for charging the electrodes 5 at different polarity to establish electrical fields between them to attract the charged particles as will be made clearer hereafter.

The electrodes are charged at an operating voltage (for example 1.6 Volts) and are obtained with overlapping and interfacing layers of conductive material, separated from one another by separating layers 7 between which runs the flow of fluid to be treated containing the ionized particles that it is wished to at least partially remove.

The conductive layer that form the electrodes 5 are made from a conductive material with a porous structure or else with a formation of surface pores that offer a substantial exchange surface with the liquid.

The material that makes up the conductive layers can be any material known to be used in the electrochemical processes of lead through condensers and conventionally comprises spongy active carbon or it can consist of any of the materials described for example in U.S. Pat. No. 6,413,409 attached hereto for reference from line 64 column 3 to line 41 column 4, or flexible conductive sheets of PTFE and carbon particles as described in U.S. Pat. No. 7,175,783 attached hereto for reference, or else any material described in U.S. Pat. No. 6,709,560, attached hereto for reference, from line 26 column 6 to line 23 column 7.

The separating layers 7 can in turn be intended to consist of highly porous non-conductive materials, capable of insulating the electrodes, allowing the flow of fluid to pass, like for example a porous synthetic material or other non-conductive spacing materials like fibreglass or nylon fabric.

The size, shape and distribution of the layers of conductive material that make up the electrodes 5 or the size, shape and distribution of the layers of separating material arranged between the electrodes do not form the specific object of any claims and will not be described in detail since they are well known to the man skilled in the art and, purely as an example, are described in U.S. Pat. No. 6,413,409 or in U.S. Pat. No. 6,709,560, attached hereto for reference, in particular from line 11 to line 23 of column 7.

Hereafter, for the sake of simplicity of schematisation we shall refer to two cells, a first cell 2' and a second cell 2", however it should be understood that the term cell can analogously mean two groups of cells, and that each cell or group of cells can be formed from one condenser or from many lead through condensers.

The apparatus 1 comprises a hydraulic system, which feeds the two cells 2', 2" with a flow of fluid to be treated by means of a supply duct 50 divided into a first and a second supply branch, respectively indicated with 50' and 50", each intercepted by a first solenoid valve 60.

The flow of fluid that crosses the two cells 2', 2" is conveyed in respective first and second extraction ducts 70', 70", each of which is divided into a service branch 80, susceptible to transport the flow of fluid treated by the corresponding cell having a low concentration of ionized particles, and in an evacuation branch 90, susceptible to transport a discharge flow usually, as will be indicated more clearly hereafter, having a high concentration of ionized particles.

With reference to the embodiment illustrated as an example in FIG. 1, the service branch 80 of each extraction duct 70', 70" is intercepted by a second solenoid valve 100 whereas the evacuation branch 90 is intercepted by a third solenoid valve 110.

The direct current power supply 6 is connected to the condensers of the two cells 2', 2" through an electric circt it, which will be described in detail hereafter, and is provided with a control card 12, of the microprocessor integrated circuit type, which, in the different operating steps of the operating cycle of the two cells 2', 2", typically by means of semi-conductor switches, controls the voltage applied to the electrodes by means of suitable connection collectors.

The cycle of each cell 2', 2", in a per se totally conventional way that is well known to the man skilled in the art, foresees: a charging step, in which the adjacent electrodes 5 with different polarity of the condensers 4 of the cell 2 are charged and brought to a foreseen operating voltage, for example equal to 1.6 V, and a service step, in which with the electrodes charged, the flow of fluid to be treated is forced to pass through the condensers of the cell 2, 2", through the respective first and second supply duct 50', 50" and first and second extraction duct 70', 70". During such a service step the fluid is purified of the polarised particles due to the fact that the ionized particles are attracted by the respective electrodes with opposite polarity to their own determining a progressive build up of the ionized particles on the same electrodes 5.

Once the programmed saturation of the electrodes with the polarized particles present in the fluid is reached, there s a regeneration step of the cell 2', 2", in which with the electrodes 5 deactivated, a flow of washing fluid is forced to pass in the condenser of the respective cell 2', 2" with consequent removal of the ionized particles built up on the electrodes 5.

With reference to the scheme of FIG. 1, during the regeneration of the first cell 2' the solenoid valve 100 of the service branch 80 of the respective first extraction duct 70' closes and the third solenoid valve 110 of the evacuation branch 90 opens. Usually, the flow that passes in the evacuation branch 90 will be considered to be waste and, in the case in which it is an apparatus for deionizing water, it will be sent to the normal discharge 170 foreseen for the hydraulic system.

Similarly, in a different operating step of the apparatus 1, the regeneration of the second cell 2" will be carried out by closing the solenoid valve 100 of the service branch 80 of the respective second extraction duct 70" and by opening the third solenoid valve 110 of the evacuation branch 90 of the same second extraction duct 70".

By the term "deactivated" we mean all conditions that the electrodes 5 are subjected to before restarting the charging step. During the regeneration step indeed there is preferably a discharging step with short-circuiting of the electrodes 5, a reverse polarity charging step, in which the electrodes 5 are subjected to a reverse polarity voltage aimed at taking the charged particles away from the electrodes 5 in which they had built up, and a voltage-free step, before restarting the charging step.

Therefore, by the term "deactivated" referring to the electrodes 5 we mean all the possible voltage conditions present at the electrodes 5 in the regeneration step, such as: the condition with the electrodes short-circuited, the condition the electrodes charged at reverse polarity, the condition with the electrodes disconnected from the power supply.

Preferably, the passage of the washing fluid will be carried out just during the reverse polarity charging step, i.e. when the charged particles are taken further away from the electrodes by the electrostatic repulsion of the field reversal.

Before continuing with the service step there can also be a pre-production step, in which the flow of fluid to be treated continues to be conveyed to the discharge, waiting until the condensers of the relative cell 2 reach the charge (and therefore the voltage) to the foreseen voltage and thus until the electrodes 5 are completely efficient for their action of purifying the liquid of the ionized particles.

The charging step of each cell 2', 2" is distinguished by an initial high absorption of energy from the power supply 6, which produces a very high absorbed inrush current. The latter tends to drop as the condensers of the respective cell 2', 2" charge until it becomes quite low during the service step and substantially equivalent to the charge exchanged by the electrodes 5 with the fluid.

A master cpu logic control unit 13 actuates the different operative steps of the apparatus 1 in particular driving a controller 14 responsible for the actuation of the individual solenoid valves that control the hydraulic system.

Advantageously, the cpu 13 is connected to conductivity sensors 15 arranged to intercept the first and the second extraction duct 70', 70", to check the conductivity of the fluid that has been treated by the corresponding first and second cell 2', 2". The cpu 13 is also connected to a flow meter 16, arranged to intercept the first and the second supply duct 50', 50" to check the flow rate entering into the corresponding cells 2', 2".

Thanks to the assumed flow rate and conductivity values, the cpu 13 can programmably vary its operation by foreseeing, for example, more or less long service steps with respect to the regeneration steps.

The operating method of the apparatus 1 according to the invention foresees, for each of the two cells 2', 2", the cyclical repetition of the charging step, in which the electrodes 5 of the condensers of a cell are brought to the operating voltage; of the service step, in which the flow of fluid to be treated is forced to pass in the cell through its electrodes 5 with consequent build-up of the ionized particles on the same electrodes 5; and of the regeneration step, in which, with the electrodes 5 deactivated, a flow of washing fluid is forced to pass into the condensers of the cell 2 with consequent removal of the ionized particles built up on the electrodes.

Considering the charging step inside the service step as an initial part of the service step at the same polarity, then the service and regeneration steps of the operating cycle of one cell can be considered to alternate with those of the other cell, indeed with the service step of one substantially corresponding to the regeneration step of the other and vice-versa.

Therefore, while one cell is regenerating, the other is in service step to produce a purified fluid.

In this way the apparatus 1 according to the present invention allows a substantially continuous flow to be produced.

Moreover, the staggering of the regeneration step of the two cells allows the power supply to be sized for current peaks of lower absorption than the sum of the peaks required by the individual cells.

According to the idea forming the basis of the present invention, the operating method of the apparatus 1 foresees that when a first cell 2' (or the first group of cells) is at the start of its charging step, the other cell or rather the second one 2" (or the second group of cells), once it has completed its service step, begins its regeneration step connecting in series with reverse polarity to the first cell 2' to at least partially discharge its electrodes on the aforementioned first cell 2', in an energy recovery step.

During the aforementioned energy recovery step, the first cell 2' is also powered by the power supply 6 with a voltage controlled by the control card 12 to generate a predetermined voltage, preferably equal to the value of the operating voltage that must be maintained during the service step, across the first cell 2'.

During the energy recovery step, therefore, the power supply 6 modulates the voltage on the first cell 2' at the operating value at which it is intended to operate during the service step, compensating for the progressive drop in voltage on the second cell 2".

Of course, similarly, in turn the first cell 2' discharges with reverse polarity at the start of its regeneration step on the second cell 2" that must be charged.

The operation of the two cells is as stated earlier with the respective operating cycles staggered so that when one cell is in service step powered at the operating voltage (for example 1.6 volts), the other cell is in regeneration step with the electrodes deactivated or in short, or else charged with reverse polarity or with zero voltage.

The present invention requires the use of an even number of cells to transfer the charge energy built up on the electrodes of the condensers of one cell during the service step (and due to the charged particles held on the electrodes themselves) on the discharged condenser of the other cell that needs to be charged.

In order to regenerate the cell it is indeed necessary to go through the discharging of the electrodes (then it is also foreseen to reverse their polarity) in order to separate the ionized particles from the electrodes themselves. Through the discharging of the electrodes, the amount of energy supplied in the service step is released, minus the losses in particular due to the migration of the charged particles towards the ions.

At the start of the charging step of the first cell 2', when it is necessary to have a current peak so that the relative condenser is completely discharged, the second cell 2" is then for this purpose connected through a suitable electrical connection described in detail hereafter, in series and with reverse polarity to the first cell 2'. The second cell 2" thus acts as an aid to the power supply 6 to power the first cell 2' from the charging step and preferably up to a first part of the service step.

Indeed, in the case of very big condensers for example with capacity of 40-50 farad, the initial charging time with a power supply, capable of supplying a current of 120 amperes, is about 2-3 seconds.

The useful discharging period of the second cell 2", in which the charged particles release their charge to the electrodes, to transfer them to the other cell 2', can even last ten seconds or more.

At the moment of the connection in series with reverse polarity of the second cell 2" to the first 2', the voltage across the first cell 2' will instantly be given by the voltage on the second cell 2" plus the voltage of the power supply 6. The two voltages add to one another. At the moment when the two cells 2', 2" are electrically connected, all of the charge of the second cell 2" goes onto the first 2', after which the second cell 2" begins to discharge and the voltage across it begins to decrease, so that it is increasingly supported by the power supply 6. The energy peak determined by the absorption of current of the first cell 2' at the start of the charging step is largely provided by the second cell 2", i.e. by the charges of the ionized particles that have built up on the electrodes, allowing the power supply 6 to save a substantial amount of energy in the initial charging step.

Therefore, the energy, recovery step, i.e. in which the charge of the cell 2 being regenerated that must be discharged is exploited, preferably also extends after the end of the charging of the other cell 2 up to an initial part of the service step of the latter.

Each cell 2 in the service step behaves substantially like a condenser that holds the charged particles on the electrodes 5, charging them. Once the service step is complete, the cell 2 is a battery capable of releasing the charges attached to the electrodes 5 to the other cell 2 over time. Basically, that which is a condenser in the service step then becomes a voltage generator in the discharging step.

From the circuit point of view, the control card 12 of the power supply 6 is provided with a microprocessor that receives the signals of the steps from the master cpu logic control unit 13 and preferably keeps the voltage value across the cell to be charged and to be brought into the service step constant, adapting the voltage across it, i.e.supplying the energy level that the other cell connected in series and that is gradually discharging is unable to provide.

For this purpose, the power supply is provided with a DC/DC converter controlled by the firmware of the microprocessor to generate direct voltages of variable value.

Therefore, with the first cell 2', which must go into service, and the second cell 2" which is discharging, the firmware of the power supply 6, through a voltmeter, assumes the value of the voltage on the first cell 2' intended to be charged and brought into service (i.e. during the energy recovery step) and produces an analogue signal Vout with which it controls the DC/DC converter of the power supply so that it generates a compensation voltage to compensate the voltage level that the second cell 2" is unable to supply.

Such a signal Vout will increase over time considering that the voltage of the second cell 2" drops while the same second cell 2" discharges. The signal Vout produced is suitable for controlling the converter, for example modulating its pulse width (PWM) and thereby adjusting the electrical power produced.

In other words, the firmware of the processor reads the voltage across the first cell 2' and consequently modulates the DC/DC converter to obtain the desired operating voltage value across the same first cell 2'.

The power supply 6 thus made, able to be voltage-controlled, is suitable for modulating its output voltage in order to keep the voltage across the first cell 2' supplying the energy level that the discharging second cell is no longer able to supply.

The microprocessor of the power supply 6 also and preferably detects also the voltage across the second cell 2", to keep it connected in series to the first so that it is able to make its own contribution to the power supply of the first cell 2', after which it excludes it by acting on the foreseen switches of the electric circuit, as will be better described hereafter.

The energy recovery step therefore runs out after a useful connection time in series of the two cells 2', 2" when the cell that is discharging (in the example described above the second cell 2") reaches a voltage value below a minimum threshold value, for example corresponding to 0.1 Volt, for which reason the contribution to the power supply 6 for charging the other cell (in the example described above the first cell 2') is negligible.

The logic control unit 13 controls the controller of the valves 14 of the hydraulic circuit and the card 12 of the po supply 6 to supply the cells 2 according to the operative cyclical sequence described earlier.

Figure 2:
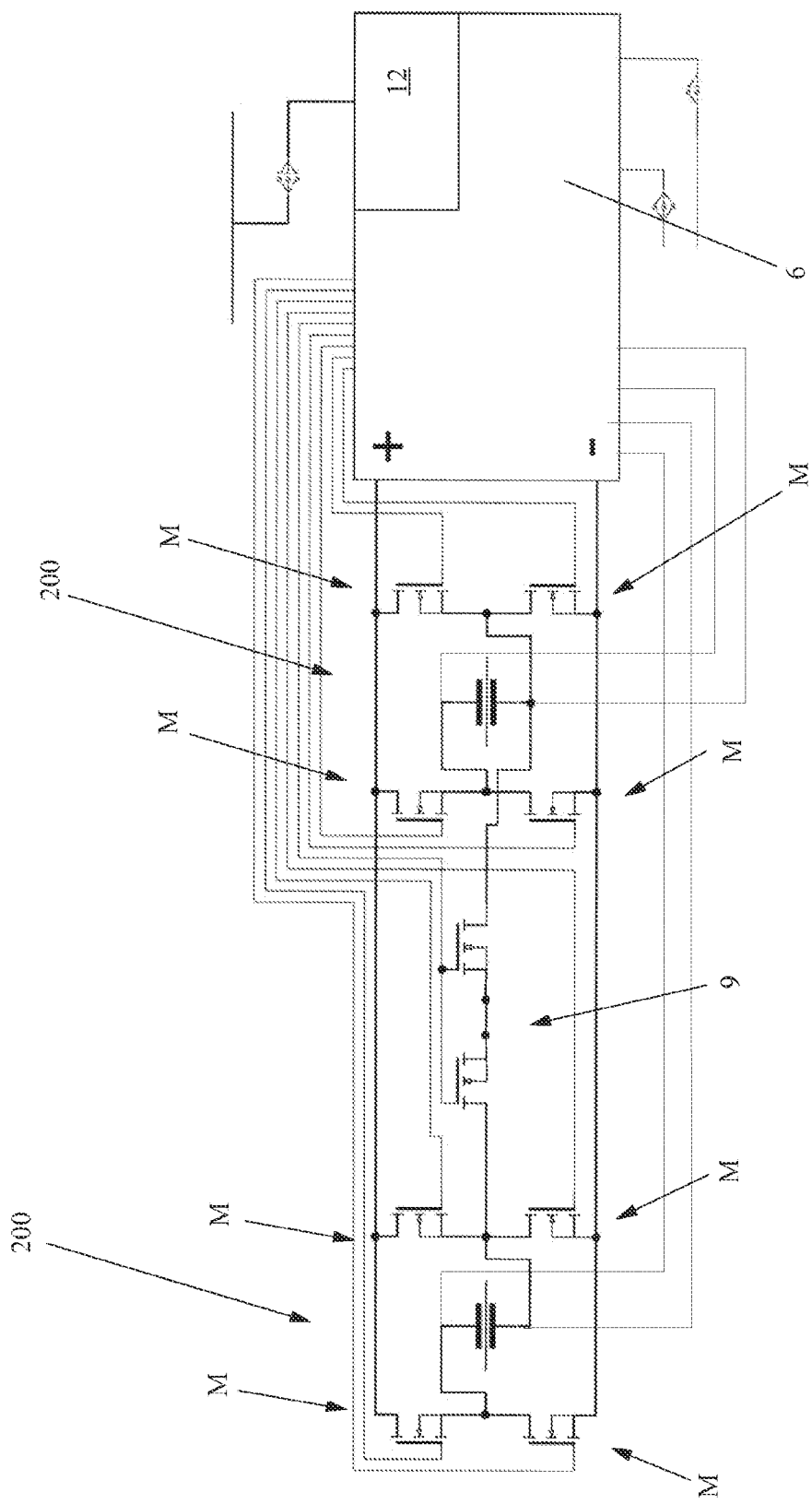
FIG. 2 shows an example of an electrical scheme for powering two cells of the apparatus according to the present invention.

With reference to the attached FIG. 2, the electrical circuit can be configured with two H-bridges, indicated with 200 each supplying one cell 2, connected together by a bidirectional switch 19.

Each H-bridge s formed from 4 mosfet M connected to a DC/DC converter of the power supply, capable, for example, of converting the 12 Volt output voltage from a main DC/DC converter common to the two bridges (for example from 220 Volts to 12 Volt), into an adjustable output voltage, for example of 1.6 Volts.

FIGS. 3-12 illustrate the electrical power supply circuit of the cells 2 (represented in a different manner with respect to the circuit of FIG. 2 for easier understanding) with the switches indicated in the different possible positions to carry out the steps described above.

Figure 3:
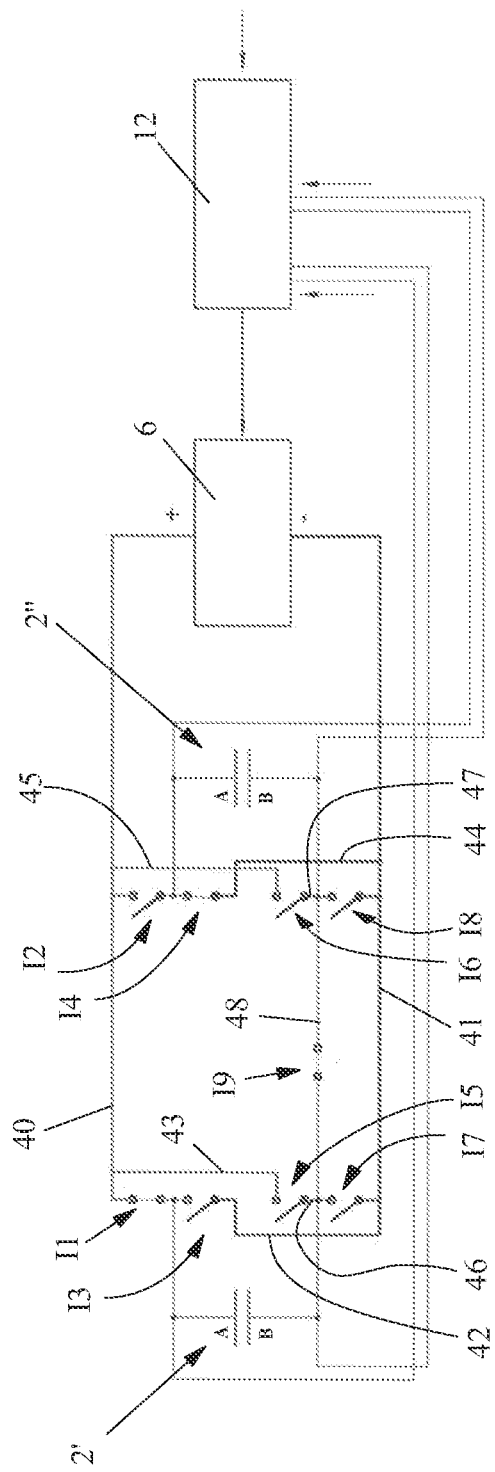
FIGS. 3, 4, 5, 6, 7, 8, 9, 10, 11, and 12 show the different positions assumed by the switches of an electrical scheme for powering two cells of the apparatus according to the present invention.

The steps of the operating cycle of the two cells 2', 2" are therefore made clearer, in detail, for a man skilled in the art, in the sequence of diagrams of the electric circuit represented in the aforementioned FIGS. 3-12. It has been chosen to start the illustration of the aforementioned operating cycle with the first cell 2' at the start of its charging step and the second cell at the start of its regeneration step (FIG. 3).

In greater detail, the directional switches of the electric circuit have been indicated with I1-I8, and the bidirectional switch, quoted earlier and advantageously obtained with the succession of two directional switches has been indicated with I9. A and B respectively indicate the positive pole and the negative pole (or earth pole) of the cells 2' and 2".

Each directional switch is for example obtained with a MOSFET, i.e. with a semiconductor-controlled switch such as IGBT, BJT or SCR.

In greater detail, the circuit is made up of two main connections, a first main connection of which 40 is connected to the positive pole of the power supply 6 as well as to the positive pole of the first 2' and second cell 2" through the switches I1 and I2, respectively, and a second main connection 41 of which is connected to the negative pole of the power supply 6 as well as to the negative pole of the first 2' and second cell 2" through the switches I7 and I8, respectively.

Furthermore, there are four respective bridge connections—a first bridge connection 42 arranged to connect between the positive pole of the first cell 2' and the negative pole of the power supply 6 and intercepted by the switch I3, a second bridge connection 43 arranged to connect between the negative pole of the first cell 2' and the positive pole of the power supply 6 and intercepted by the switch I5, a third bridge connection 44 arranged to connect between the positive pole of the second cell 2" and the negative pole of the power supply 6 and intercepted by the switch I4, a second bridge connection 43 arranged to connect between the negative pole of the second cell 2" and the positive pole of the power supply 6 and intercepted by the switch I6.

The switches I5 and I7 are connected in series by a first auxiliary connection 46, whereas the switches I6 and I8 are connected in series by a second auxiliary connection 47.

A connection 48 is also foreseen to recover the energy intercepted by the bidirectional switch I9 (for example consisting of two directional MOSFETs in succession as indicated in FIG. 2) and connected on one side to the negative pole of the first cell 2' as well as to the first auxiliary connection 46, and on the other side to the negative pole of the second cell 2" as well as to the second auxiliary connection 47.

In the condition according to FIG. 3 with the first cell 2' at the start of its charging step and the second cell 2" at the start of its regeneration step (and thus empty and saturated with ions) the switches I1, I4 and I9 are closed while the other are open. The connection thus made places the second cell in series with the first and at reverse polarity.

In this case, the voltage developed by the second cell 2" due to the charge built up during its service step is in series and adds to that of the power supply 6 so that the latter must deliver a lower voltage to the first cell 2'. There is a transfer of the energy contained in the second cell 2" to the first cell 2' with lower use of the power supply 6.

Therefore, if for example the voltage of the second empty cell 2" is 1.3 volts and the necessary operating voltage on the first cell 2' that needs to be produced is 1.6 volts, it is sufficient for the power supply to give 0.3 volts to obtain the desired voltage. The negative of the cell 1 is connected to the bidirectional switch 9 that allows current to pass in the two directions.

Figure 4:
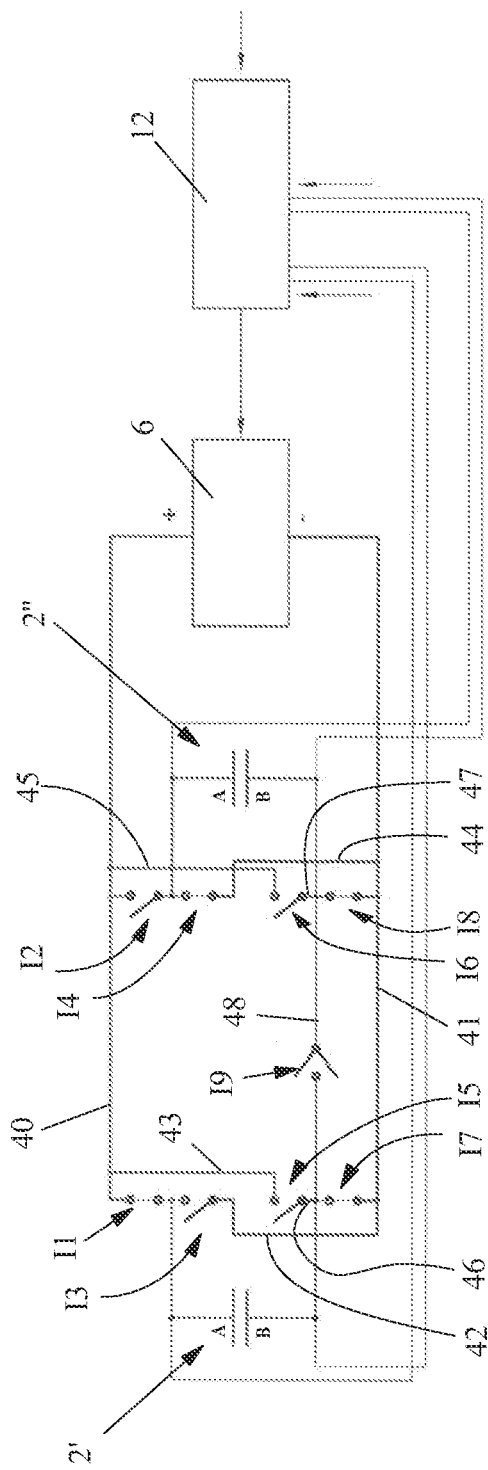

In the subsequent condition according to FIG. 4, the first cell 2' is now in the service step (i.e. the charging step is ending) and it is powered directly by the power supply 6 given that the second cell 2" has now given up almost all of its charge. The second cell 2" is short-circuited to ensure that the electrodes of its condensers are completely discharged. In the case in which the discharging of the second cell 2" can be considered to be complete already with the connection in series to the first cell 2', then the condition represented by FIG. 4 can be avoided, or it can be foreseen for a very short time. The discharging in short is thus used to completely balance the cell to avoid there being leftover charge in the long term. This can for example be due to the fact that the bidirectional switch has a voltage drop (for example of the order of 30-40 millivolt) that does not allow the second cell 2" to be completely discharged very quickly. Therefore, the condition of FIG. 4 is to make the electrodes as discharged as possible. In this condition, the switches I4 and I8 are closed to short-circuit the second cell 2" while the switches I1 and I7 are closed to power the first cell 2'.

In this condition ton the two cells 2', 2" therefore operate completely independently.

Figure 5:
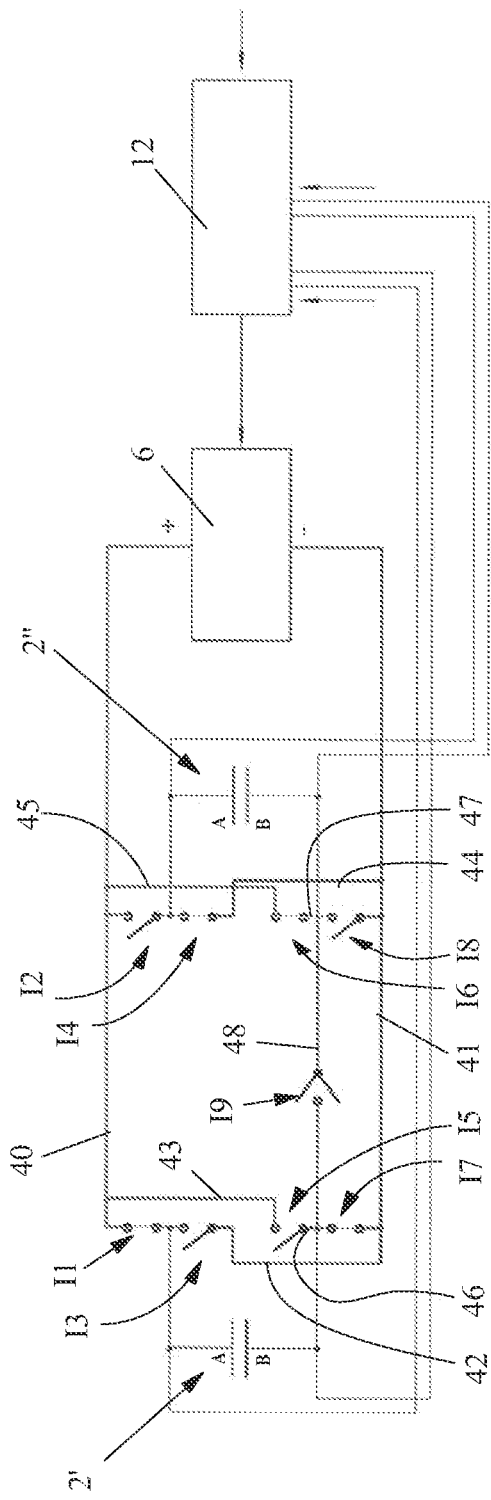

Preferably, in the condition of FIG. 4 with the electrodes of the second cell 2" short-circuited, the washing fluid is not sent In the subsequent condition according to FIG. 5 the second cell 2" is charged at reverse polarity to take the ions away from the electrodes and thus proceed to remove them from the second cell 2" through a washing flow.

Also in this condition the second cell 2" is building up a charge although of opposite polarity to that built up during the service step and smaller in size. Indeed, the amount of charge of the condenser due to its capacity as a function of the voltage applied is in any case much less than the amount of charge due to the build-up of charged particles on the electrodes. In this condition of FIG. 5, the cells are powered independently from the power supply 6 and the switches I4 and I6 are closed to power the second cell 2" while the switches I1 and I7 are closed to power the first cell 2'.

Advantageously, the flow of washing water will only be present with reverse polarity. In order to avoid problems of over-saturation of the salts in the fluid with their consequent precipitation it is preferable to divide the reverse polarity condition into many shorter steps separated by conditions with the electrodes short-circuited (FIG. 4) but without passage of washing fluid.

Figure 6:
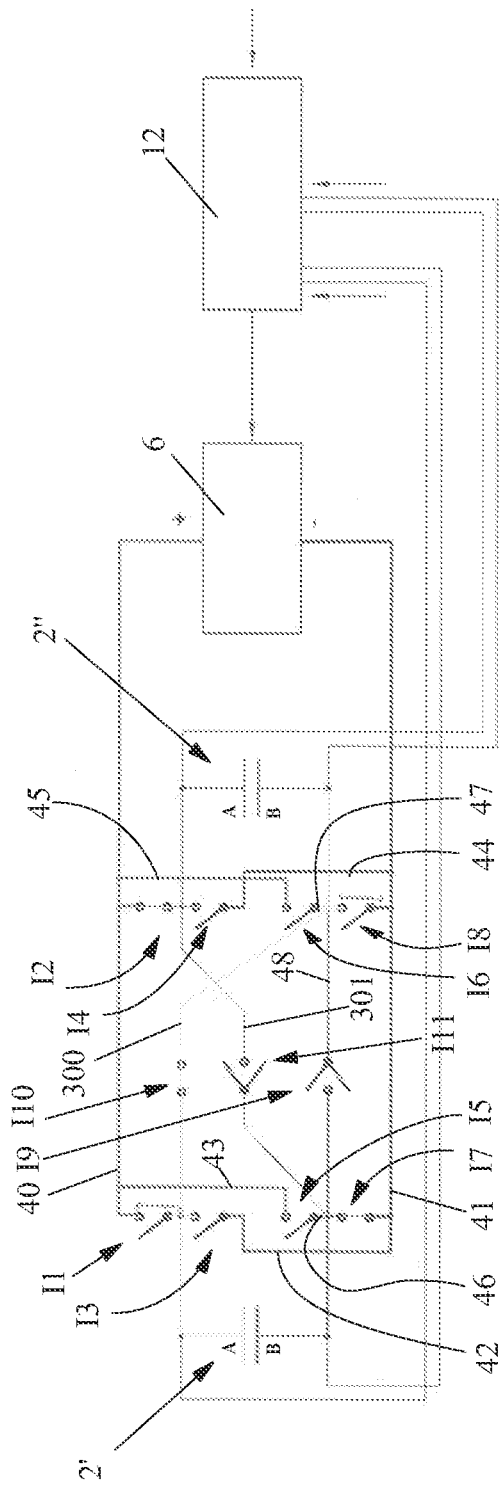

In the subsequent condition according to FIG. 6, given that after charging at reverse polarity for washing the second cell 2" has built up energy, it can be decided to recover it by connecting the second cell 2" in series with the first 2'. The recovery of energy in this case is due to just the charge of the condensers of the second cell 2". Given that this level of energy is small with respect to that recovered in the condition according to FIG. 3 as a result of the charged particles built in the service step, and given that the recovery of such a level of energy requires a complication of the circuit, it may be decided to skip such a condition of FIG. 6 and not to recover such energy.

In this condition of FIG. 6, it is necessary to foresee a further electrical connection 300 between the cells intercepted by a switch I10 and arranged to connect the negative of the second cell 2" with the positive of the first cell 2'. In the aforementioned condition the switches I2, I7 and I10 are closed while the other are open. The connection thus made places the second cell 2" in series with the first cell 2' without however, in this case, polarity reversal, given that the same reversal has already been carried out on the electrodes of the condensers of the second cell 2" powering them at reverse polarity in the previous condition of FIG. 5.

In order to completely remove the opposite charge assumed by the electrodes in this step, there can again be a condition of short-circuiting of the second cell 2" as in FIG. 4, in which however the washing of the cell is also carried out with the passage of a flow of fluid.

Thanks to the discharging of the second cell 2" on the first and to said step of further short-circuiting the second cell 2", the pre-production step quoted earlier and described hereafter can be avoided or shortened.

Figure 7:
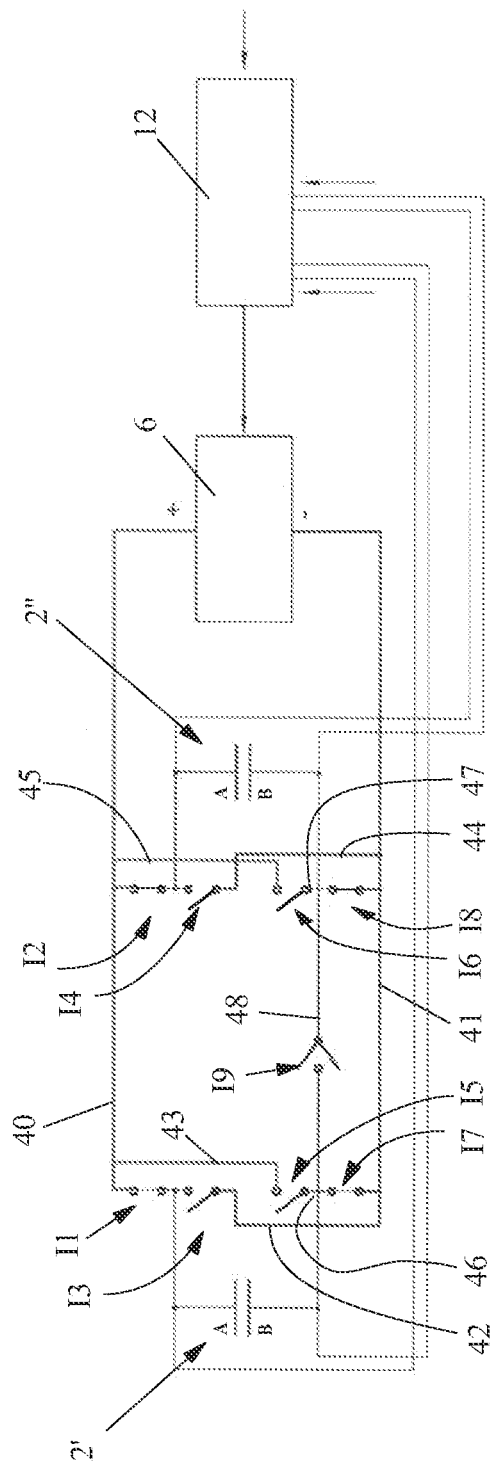
Figure 8:
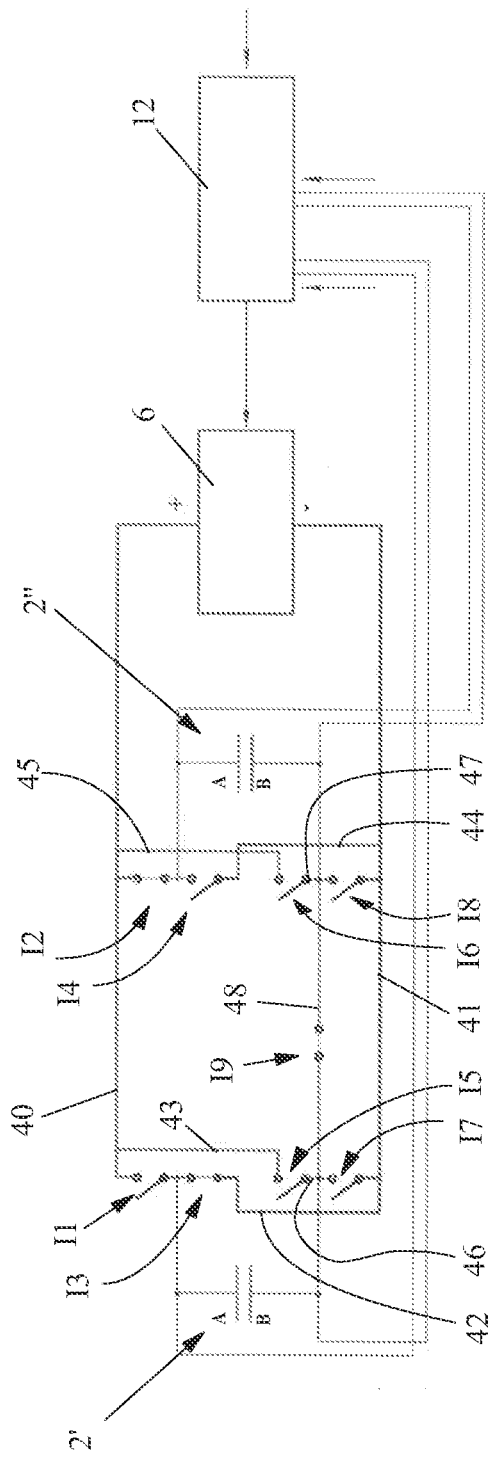
Figure 9:
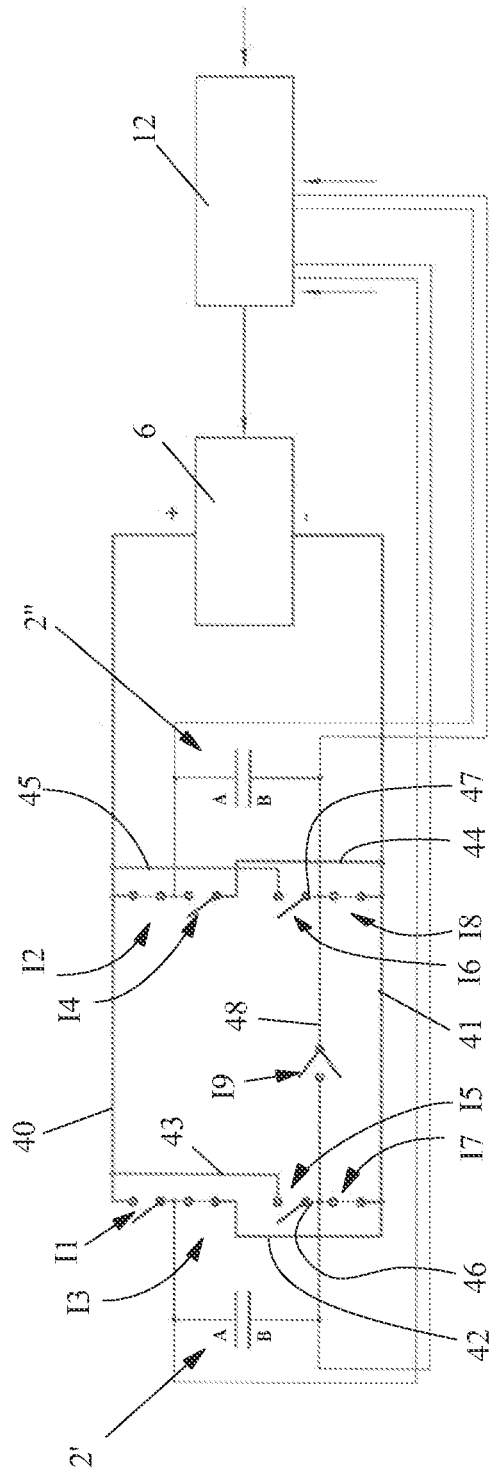
Figure 10:
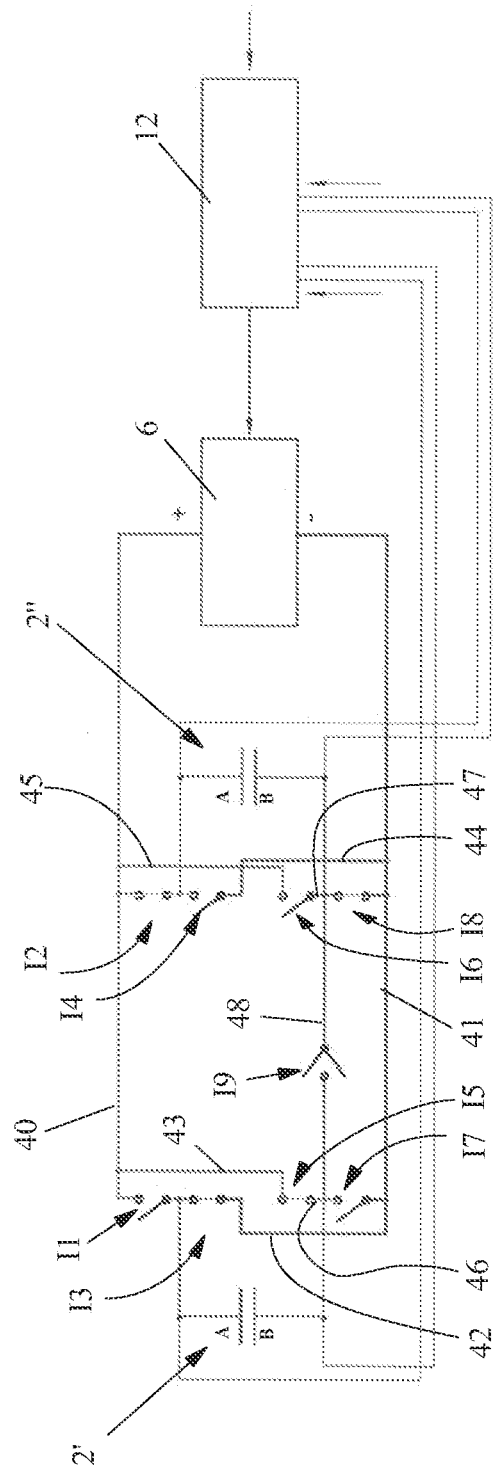
Figure 11:
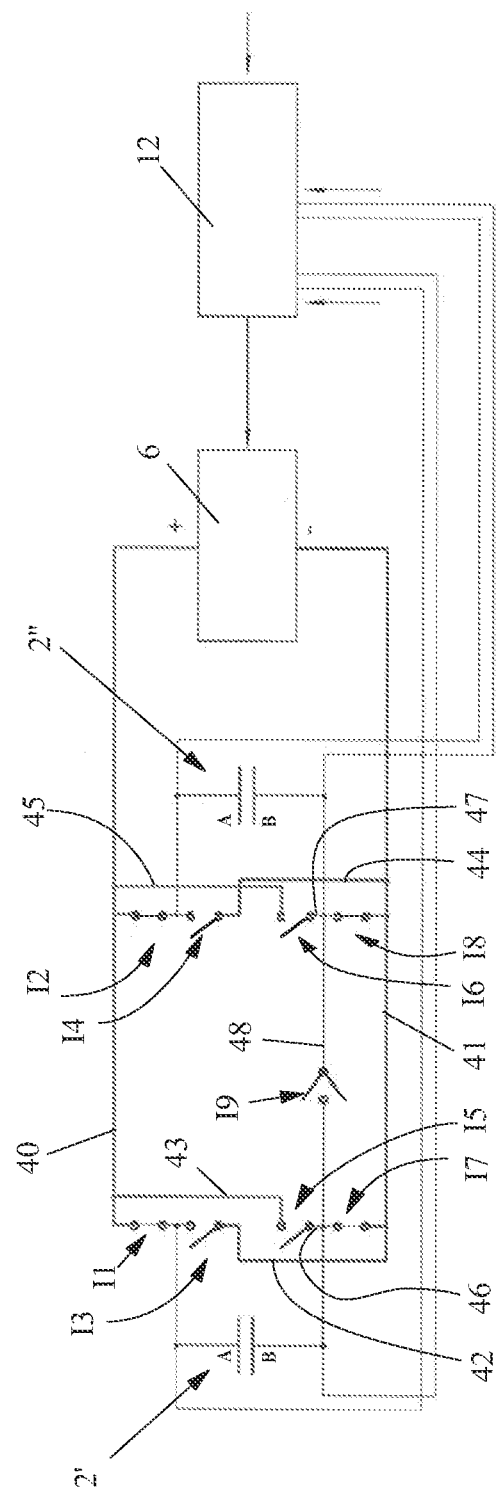

Therefore, in the subsequent condition according to FIG. 7, both of the cells are powered with the same polarity and for this purpose the switches I1 and I7 are closed to power the first cell 2' and the switches I2 and I8 are closed to power the second cell 2". During the pre-production step, the flow of fluid that crosses the second cell 2" is sent to the discharge instead of to the service waiting for its electrodes to be completely efficient for their action of purifying the liquid of the ionized particles.

FIGS. 8-12 illustrate the remaining conditions assumed by the electric circuit in the operating cycle of the apparatus according to the invention. They are not described in detail since they once again propose the same conditions of FIGS. 3-7 just referring to reversed cells.

Figure 12:
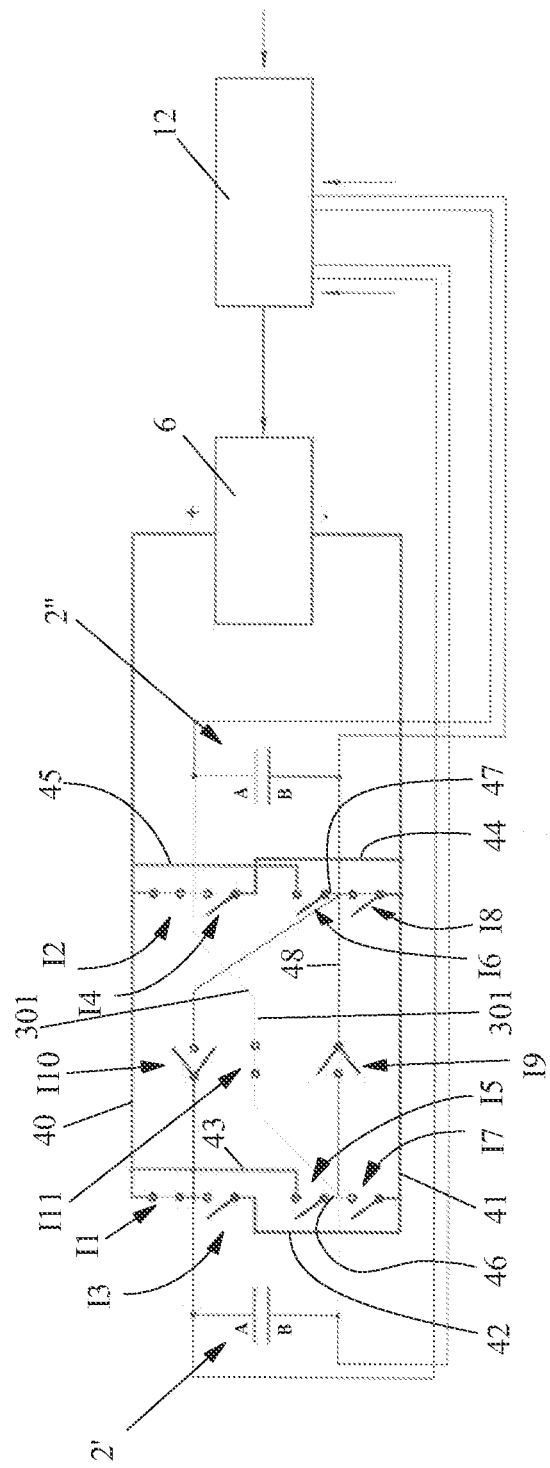

In the condition according to FIG. 12 there is recovery of energy that has built up on the first cell 2' after its charging at reverse polarity towards the second cell 2". In this condition of FIG. 12, it is necessary to foresee a further electrical connection 301 between the cells 2', 2" intercepted by a switch I11 and arranged to connect the positive of the second cell 2" with the negative of the first cell 2'. In the aforementioned condition the switches I1, I8 and I11 are closed while the others are open. The connection thus made places the first cell 2' in series with the second cell 2" without polarity reversal, given that the same reversal had already been carried out on the electrodes of the condensers of the first cell 2' powering them at reverse polarity in the previous condition of FIG. 11.

FIGS. 14 to 19 illustrate a variant embodiment of the electric circuit as a non-limiting example.

Figure 14:
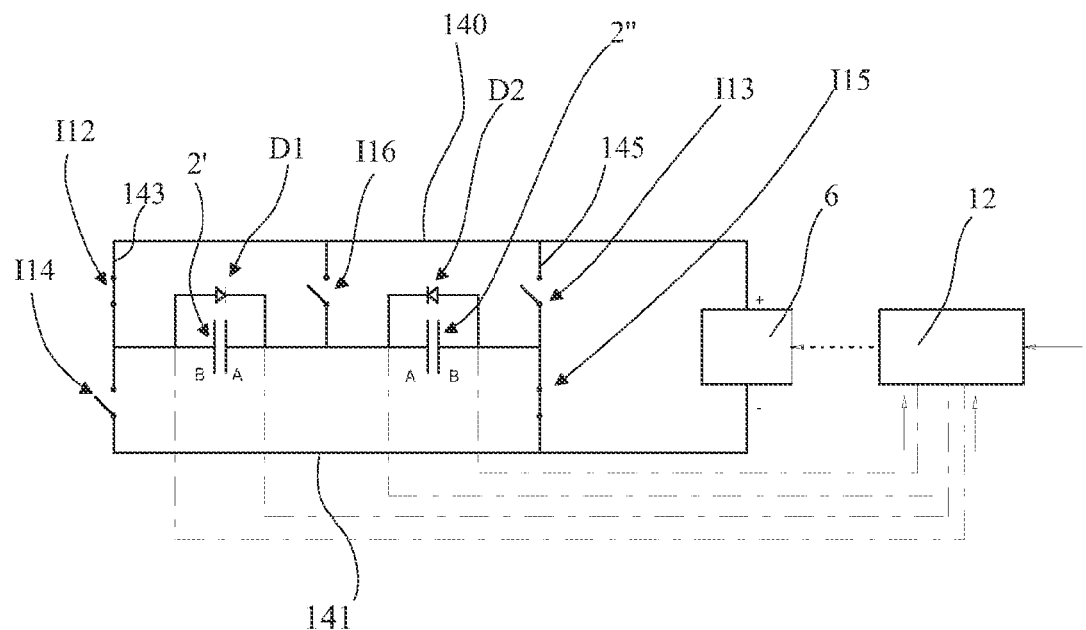
FIGS. 14, 15, 16, 17, 18, and 19 show the different positions assumed by the switches of a variant electrical scheme for powering two cells of the apparatus according to the present invention.

In particular, FIGS. 14-19 illustrate the electric circuit for powering the cells 2 with the switches indicated in the different possible positions to carry out the steps described above. The steps of the operating cycle of the two cells 2', 2" is therefore made clearer, in detail, for a man skilled in the art, in the sequence of diagrams of the electric circuit represented in the aforementioned FIGS. 14-19. It was chosen to begin the illustration of the aforementioned operating cycle with the second cell 2" at the start of its charging step and the first cell 2' at the start of its regeneration step (FIG. 14).

In greater detail, the switches of the electric circuit for example obtained with MOSFET or else with a semiconductor-controlled switch such as IGBT, BJT or SCR have been indicated with 112-116.

Such switches I12-I16 are suitably connected to a DC/DC converter of the power supply, capable, for example, of converting the 12 Volt output voltage from a main DC/DC converter common to the two bridges (for example from 220 Volts to 12 Volts), into an adjustable output voltage, for example of 1.6 Volts.

The positive pole and the negative pole (or earth pole) of the cells 2' and 2" have been respectively indicated with A and B.

In greater detail, the circuit is made up of two main connections, a first main connection of which 140 is connected to the positive pole of the power supply 6 as well as to the positive pole of the first 2' and second cell 2" through the switch I16, and a second main connection 141 of which is connected to the negative pole of the power supply 6 as well as to the negative pole of the first 2' and second cell 2" through the switches I14 and I15, respectively. Furthermore, there are two respective bridge connections—a first bridge connection 143 arranged to connect between the negative pole of the first cell 2' and the positive pole of the power supply 6 and intercepted by the switch I12, a second bridge connection 145 arranged to connect between the negative pole of the second cell 2" and the positive pole of the power supply 6 and intercepted by the switch I13.

In particular, in said variant the control card 12 of the power supply 6 cyclically connects with reversal of the polarity of its opposite poles at the cells 2' and 2", which are electrically connected in series with each other with reverse polarity, through the actuation closed of two different pairs of switches of the circuit.

Figure 17:
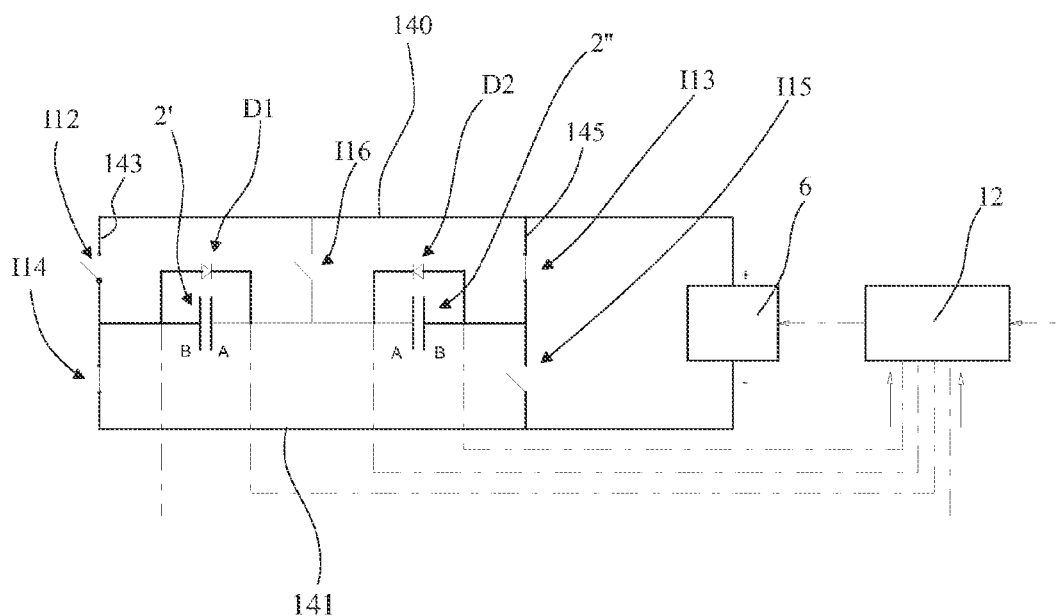

In particular, the configurations resulting from such a polarity reversal are illustrated as a non-limiting example in FIGS. 14 and 17, respectively.

A first of said pairs is suitably formed by the switches I12 and I15, and the second pair is advantageously formed by the switches I13 and I14.

With the cyclical alternation of the closing of the switches of the first pair, I12 and I15, and of those of the second pair, I13 and I14, each individual cell 2' and 2" is powered cyclically in staggered periods at an operating voltage, partially through the discharging of the other cell that is not powered and partially through the power supply 6.

Advantageously, each polarity reversal results in the connection of the positive pole of the power supply to a first cell 2' arranged at the start of a regeneration step thereof (i.e. electrostatically charged) and arranged in series with reverse polarity to the second cell 2" that is at the start of its charging step (i.e. electrically discharged).

In this way the second cell 2" is powered at an operating voltage, partially through the discharging of the first cell 2' that is not powered and partially through the power supply 6.

By cell that is not powered suitably we mean the cell for which the feeding of the power supply is intended, and therefore the cell that is not in the charging or service step.

Advantageously, there are also diodes D1 and D2 electrically connected in parallel substantially to each of the cells 2 to limit the voltage applied on them when they are connected with equipolar charge to the power supply.

In greater detail, in the condition according to FIG. 14 with the first cell 2' at the start of its regeneration step (and therefore empty and saturated with ions) and the second cell 2" at the start of its charging step the switches I12 and I15 are closed while the others are open. The connection hus made places the first cell in series with the second and at reverse polarity.

In this case, the voltage developed by the first cell 2' due to the charge built up during its service step is in series and adds to that of the power supply 6 so that the latter must deliver a lower voltage to the second cell 2".

There is a transfer of the energy contained in the first cell 2' to the second cell 2" with less use of the power supply 6.

Therefore, if for example the voltage of the first empty cell 2' is 1.3 volts and the necessary operating voltage on the second cell 2" that needs to be produced is 1.6 volts, it is sufficient for the power supply to give 0.3 volts to obtain the desired voltage.

Gradually, as the charge transfers from the first cell 2' to the second cell 2", the voltage across the first cell 2' decreases until it becomes ero and then reverses through the action of the power supply 6.

Thus, the first cell 2' is charged at reverse polarity obtaining the effect of taking the ions away from the electrodes and thus proceeding to remove them from the first cell 2' through a washing flow.

In this condition, the first cell 2' builds up a charge although of opposite polarity to that built up during the service step and smaller in size.

Indeed, the amount of charge of the condenser due to its capacity as a function of the voltage applied is in any case much less than the amount of charge due to the build-up of charged particles on the electrodes.

In particular, advantageously the electric circuit also comprises two diodes D1 and D2, a first diode D1 of which is connected electrically in parallel to the first cell 2' and a second diode of which is connected electrically in parallel to the second cell 2".

The diodes D1 and D2 are arranged so as to allow current to pass when the respective cells 2' and 2" are subjected to a voltage at reverse polarity that exceeds a predetermined threshold, preferably substantially equal to 0.6 volts.

The idea forming the basis of foreseeing the diodes D1 and D2 electrically connected in parallel to the cells 2' and 2" consists of limiting the voltage at reverse polarity that is applied to each cell 2' or 2" when it is in the regeneration step and reverses its polarity after having given up its charge to the other cell, which is in the charging step.

Especially, in the example dealt with now, after the first cell 2' reverses its polarity, when it reaches a voltage equal to the threshold voltage of the diode D1, for example 0.6 volts, the diode D1 becomes conductive and thus limits the voltage to which the first cell 2' is subjected to the threshold value.

Advantageously, the flow of washing water will only be present with reverse polarity.

Figure 15:
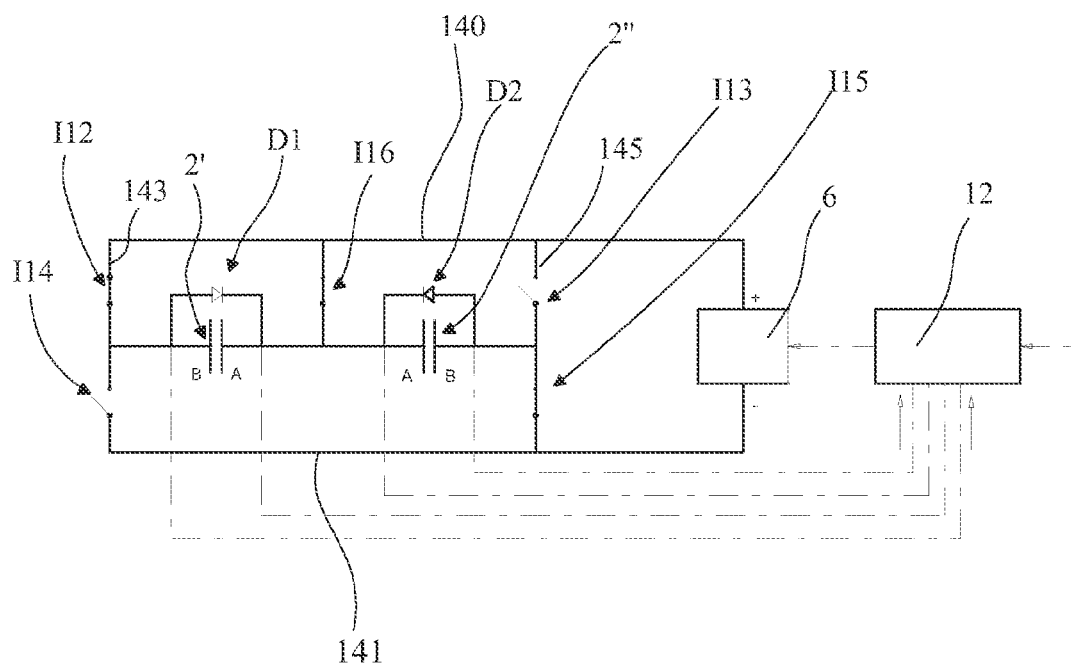

In order to remove the opposite charge assumed by the electrodes in this step there can be a short-circuit condition of the first cell 2', like in FIG. 15, in which however the washing of the cell is also carried out with the passage of a flow of fluid.

In particular, in order to obtain the short-circuit of the first cell 2' the switch I16 is closed. Thanks to said step of further short-circuiting of the first cell 2', the pre-production step quoted earlier and described hereafter can be avoided or shortened.

Figure 16:
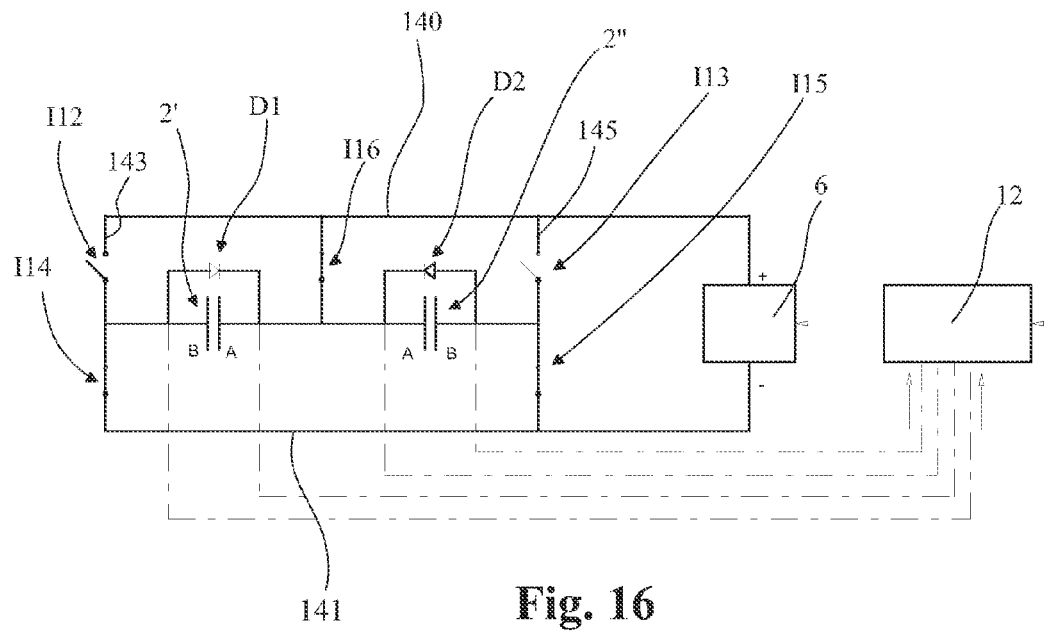

Therefore, in the subsequent condition according to FIG. 16, of the cells are advantageously powered in parallel with the same polarity and for this purpose the switches I16, I14 and I15 are closed to power the first cell 2' and the second cell 2" in parallel, while the other switches are open.

During such a possible pre-production step, the flow of fluid that crosses the first cell 2' is sent to the discharge instead of to the service waiting for its electrodes to be completely efficient for their action of purifying the liquid of the ionized particles.

In a different further variant of the electrical set-up, it differs from the one described up to now in that the electrical set-up does not comprise the diodes.

In this case, when a cell, for example the first cell 2' being regenerated, has finished giving up its charge and charges at reverse polarity, the microcontroller of the control card 12 must control the power supply 6 to supply a voltage to the cells 2 that is greater than the desired service voltage across the cell being charged or in the service step, which in the present example is the second cell 2".

Thus, when the microcontroller detects such a situation it suitably makes the cell pass at reverse polarity to the described pre-production step, and then, in the proposed example, makes the switch I12 open and at the same time makes the switches I16 and I14 close according to the configuration of FIG. 16.

Figure 18:
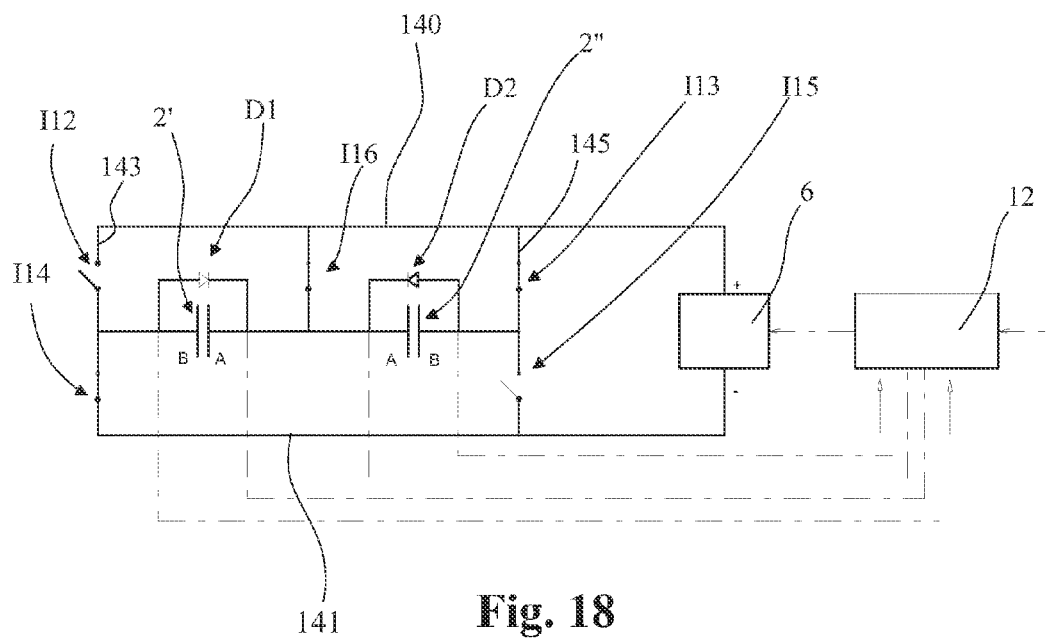
Figure 19:
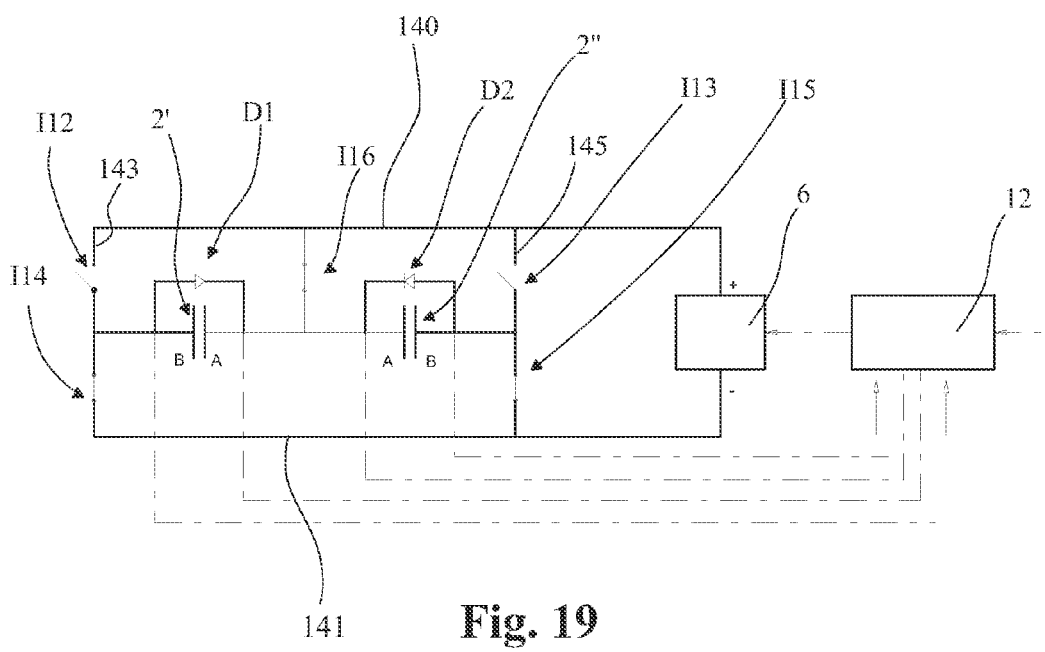

FIGS. 17-19 illustrate the remaining conditions assumed by the electric circuit in the operating cycle of the apparatus according to the invention. They are not described in detail since they again propose the same conditions of FIGS. 14-16 just referring to reversed cells. The present invention has surprisingly been able to find that the charged particles that build up and nestle on the electrodes 5 in the foreseen interstitial holes are able to provide a big energy contribution to the system, also operating as an electric flywheel capable of giving the circuit stability.

In accordance with a preferred embodiment of the present invention the electrodes 5 comprise a layer of semipermeable material 31, which can be associated in various ways with the layer of conductive material. In greater detail, such a layer 31 can be separate from the layer of conductive material or else arranged on top of its coating, or even infiltrated in its pores or consisting of the same layer of conductive material as for example described in U.S. Pat. No. 6,709,560, attached hereto for reference, from line 27 column 6 to line 10 column 7.

Figure 13:
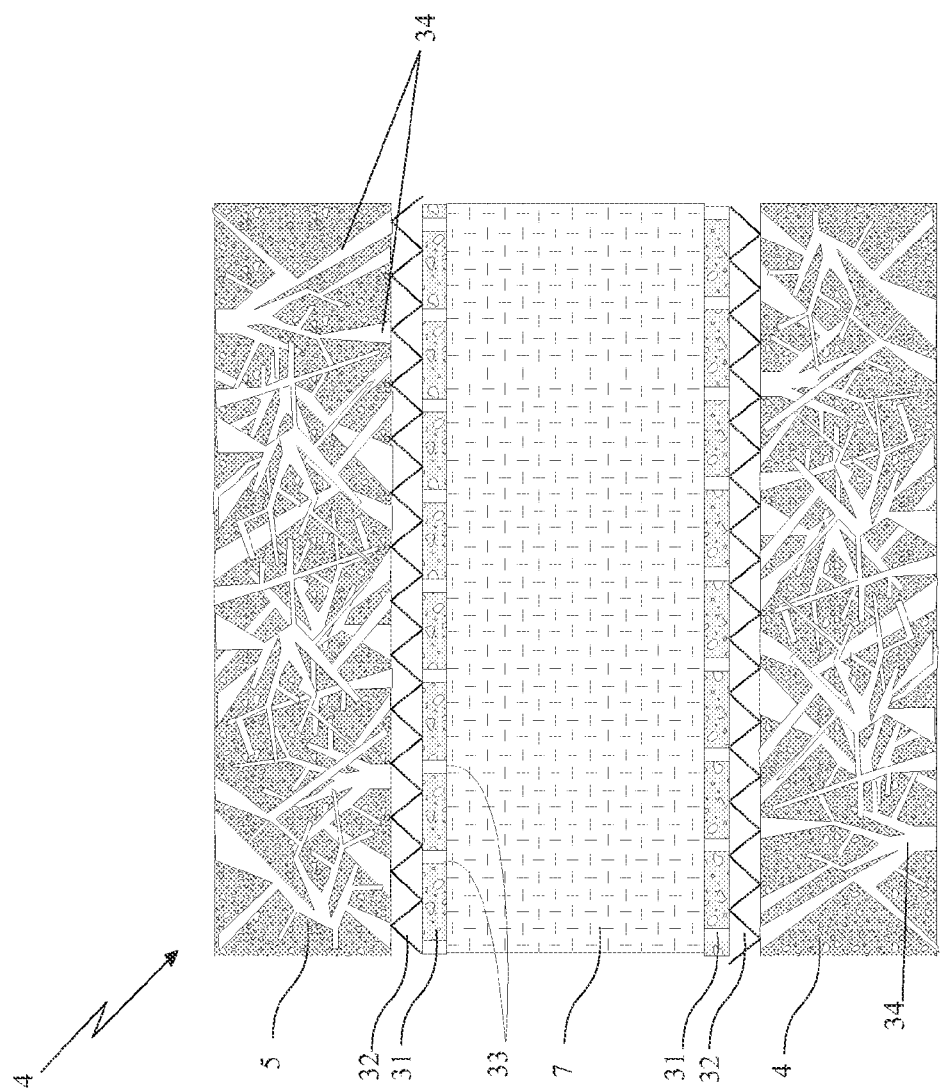
FIG. 13 schematically shows a detail of the apparatus for purifying a fluid object of the present invention relative to a portion in section of the layers that make up a lead through condenser.

In accordance with the example illustrated in the attached FIG. 13, the layer of semipermeable material 31 is separated through a spacer 32 from the surface of the electrode 5.

Such a further layer of semipermeable material 31 can be obtained with a semipermeable membrane or with one or more layers of charged material as for example described in U.S. Pat. No. 6,709,560, attached hereto for reference, from line 50 column 4 to line 10 column 7.

As described in U.S. Pat. No. 7,175,783, the layer of semipermeable material is suitable for selectively trapping the ions that migrate towards the electrodes 5 under the action of the field during the service step, allowing the performance of the condenser 2 to be improved or, in the aforementioned service step, allowing a greater amount of charged particles to be held. The latter are then at least in part released from the electrodes 5 during the subsequent regeneration step, in particular passing through foreseen holes 33 formed in the layer of semipermeable material 31.

By the term "interstitial pores" we mean all pores, micropores or holes present in the electrodes 5 or in the layers that make up the electrodes 5 such as the layers of conductive and semipermeable material 31. They have been indicated with reference to the example embodiment given in the attached FIG. 13 with reference numeral 34 with reference to the pores of the layers of conductive and semipermeable material 31, and with reference numeral 33 with reference to the holes, greater in size than the pores 34, formed on the layer of semipermeable material 31.

The method and the apparatus thus conceived therefore achieve the present purposes.

Of course, the apparatus can, in its practical embodiment, also take up different shapes and configurations from the one illustrated above without, for this reason, departing from the present scope of protection. Moreover, all of the details can be replaced with technically equivalent elements and the sizes, shapes and materials used can be whatever according to needs.

The invention claimed is:

1. Operating method of an apparatus for purifying a fluid provided with an even number of cells, each of which:

comprises at least one lead through condenser provided with two or more overlapping electrodes, facing one another, between which a flow of fluid to be treated containing ionized particles is susceptible to pass, and is electrically connected to a direct current power supply adapted to charge said electrodes at different polarities;

said method cyclically comprising for each said cell:

at least one charging step, in which said power supply charges the electrodes of said cell at different polarities;

at least one service step, in which a flow of said fluid to be treated is forced to pass through the electrodes of the lead through condenser of said cell with progressive build-up of said ionized particles on said electrodes;

at least one regeneration step, in which said electrodes are discharged and a flow of washing fluid is forced to pass in said condenser of said cell with consequent removal of said ionized particles built up on said electrodes;

starting from the step of charging at least a first cell of said cells, electrically connecting in series a second cell of said cells, once its service step is completed and at the beginning of its regeneration step, with reverse polarity to said first cell to at least partially discharge its own electrodes on said first cell, in an energy recovery step.

2. Operating method of an apparatus for purifying a fluid according to claim 1, wherein during said energy recovery step, said first cell is also powered by said power supply, wherein said power supply assumes the voltage of said first cell and by means of a control card modulates the supply voltage to said first cell obtaining a preset operating voltage on said first cell.

3. Operating method of an apparatus for purifying a fluid according to claim 1, wherein said energy recovery step extends beyond the end of the charge of said first cell for an initial part of the service step of said first cell.

4. Operating method of an apparatus for purifying a fluid according to claim 3, wherein during said energy recovery step said power supply modulates the voltage on the first cell at the operating value that it must assume during the service step, compensating a progressive voltage lowering on the second cell that is discharging.

5. Operating method of an apparatus for purifying a fluid according to claim 1, wherein during the regeneration step of said second cell, the second cell is powered for a reverse polarity washing step accumulating energy on the electrodes of its condensers; and wherein the second cell, at the end of the reverse polarity washing step, is connected in series with non-reverse polarity to said first cell to at least partially discharge its electrodes on said first cell, in an additional energy recovery step.

\* \* \* \* \*